US008139573B2

(12) United States Patent
Kim

(10) Patent No.: US 8,139,573 B2
(45) Date of Patent: Mar. 20, 2012

(54) MOBILE COMMUNICATION TERMINAL AND MULTIMEDIA MESSAGE PROCESSING METHOD USING THE SAME

(75) Inventor: Moon Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 890 days.

(21) Appl. No.: 11/327,772

(22) Filed: Jan. 6, 2006

(65) Prior Publication Data

US 2006/0153194 A1 Jul. 13, 2006

(30) Foreign Application Priority Data

Jan. 7, 2005 (KR) ................. 10-2005-0001636

(51) Int. Cl.
*H04L 12/28* (2006.01)
(52) U.S. Cl. ........ 370/389; 370/392; 709/206; 709/229; 455/412.1; 455/566
(58) Field of Classification Search .................. 370/392, 370/394, 389; 455/454, 450, 412.1, 566; 709/229, 230, 206
See application file for complete search history.

(56) References Cited

U.S. PATENT DOCUMENTS

| | | | | |
|---|---|---|---|---|
| 6,216,008 | B1* | 4/2001 | Lee | 455/466 |
| 6,230,019 | B1* | 5/2001 | Lee | 455/466 |
| 2002/0058522 | A1* | 5/2002 | Kim et al. | 455/466 |
| 2003/0086438 | A1* | 5/2003 | Laumen et al. | 370/462 |
| 2003/0233421 | A1* | 12/2003 | Shibata et al. | 709/206 |
| 2004/0057403 | A1* | 3/2004 | Jerbi et al. | 370/329 |
| 2004/0097248 | A1* | 5/2004 | Schmidt et al. | 455/466 |
| 2005/0033852 | A1* | 2/2005 | Tenhunen | 709/229 |
| 2005/0165897 | A1* | 7/2005 | Prenzel et al. | 709/207 |
| 2005/0282555 | A1* | 12/2005 | Swetina | 455/454 |
| 2007/0093256 | A1* | 4/2007 | Cha | 455/455 |
| 2007/0142029 | A1* | 6/2007 | Willehadson et al. | 455/405 |

FOREIGN PATENT DOCUMENTS

| | | |
|---|---|---|
| CN | 1764301 | 4/2006 |
| EP | 1 271 970 | 1/2003 |
| EP | 1 406 458 | 4/2004 |
| JP | 11-239171 | 8/1999 |
| JP | 2000-209257 | 7/2000 |

(Continued)

OTHER PUBLICATIONS

"Universal Mobile Telecommunications System (UMTS); Multimedia Messaging Service (MMS), Functional description; Stage 2 (3GPP TS 23.140 Version 4.2.0 Release 4)" ETSI TS 123 140 V4.2.0, Mar. 2001, XP002180514.

(Continued)

*Primary Examiner* — Dang Ton
*Assistant Examiner* — Mandish Randhawa
(74) *Attorney, Agent, or Firm* — KED & Associates LLP

(57) ABSTRACT

Example embodiments disclose a mobile communication terminal by which a user can recognize a reception-completed message among a plurality of transmission messages in a manner of searching a transmitted message by reading received transmission state data in the case of transmitting a plurality of multimedia messages sequentially from one terminal and outputting a transmission time or subject of the searched transmission message. Example embodiments also disclose transmitting the multimedia message via mobile communication network, storing transmission information including an ID of the transmitted multimedia message in a memory provided within a mobile communication terminal, receiving a multimedia message transmission confirmation message, comparing transmission information included in the received multimedia message transmission confirmation message to the information stored in the memory, and outputting a result of the comparison.

9 Claims, 6 Drawing Sheets

FOREIGN PATENT DOCUMENTS

| | | |
|---|---|---|
| JP | 2001-007899 | 1/2001 |
| JP | 2001-223808 | 8/2001 |
| JP | 2002-044338 | 2/2002 |
| JP | 2002-281550 | 9/2002 |
| KR | 10-2004-0022364 | 3/2004 |

OTHER PUBLICATIONS

Chinese IPO; Office Action in foreign application (CN 10-2005-0001636) to which priority is claimed by the present application; Jan. 18, 2008.

Chinese IPO; Office Action in foreign application (CN 10-2005-0001636) to which priority is claimed by the present application; Aug. 22, 2008.

3GPP: 3rd Generation Partnership Project; Technical Specification Group Terminals; Multimedia Messaging Service (MMS); Functional Description; Stage 2 (Release 1999): 3G TS 23.140 V3.0.1 (Mar. 2000).

Korean Office Action dated Apr. 25, 2011.

\* cited by examiner

MOBILE COMMUNICATION TERMINAL AND MULTIMEDIA MESSAGE PROCESSING METHOD USING THE SAME

CROSS REFERENCE TO RELATED APPLICATIONS

This application claims the benefit of the Korean Patent Application No. 10-2005-0001636, filed on Jan. 7, 2005, which is hereby incorporated by reference in its entirety.

BACKGROUND OF THE INVENTION

1. Field of the Invention

The present invention relates to a multimedia message processing method in a mobile communication terminal, and more particularly, to a mobile communication terminal and multimedia message processing method thereof.

2. Discussion of the Related Art

Typically, a multimedia messaging service (hereinafter abbreviated as "MMS") is a radio mail system type wireless data communication method provided by 3GPP (third generation partnership project) to support person-to-person multimedia message transfer in the third generation wireless Internet environment. The MMS, which evolved from a limited service directed towards letter or voice messages such as a short message service, is a service capable of handling multimedia data such as images, graphics, moving pictures, etc.

According to the 3GPP, the MMS performs the functions of transmitting a multimedia message (hereinafter abbreviated as "MM") regardless of the network connection of a receiving side to provide an extended multimedia service to a wire/wireless network and temporarily storing and forwarding the transmitted multimedia message. Hence, to transmit the MM, a transmitting terminal preferentially transmits the message to an MMS server. The transmitting terminal or MMS server may then provide a receiving terminal with a valid message period enabling the transmitted multimedia message not to be downloaded to the receiving terminal.

In the transmission and reception of the above described multimedia message, various states can be forwarded to the transmitting terminal in response to the demand for a transmission state message of the transmitting terminal. In this case, the various states include whether the MM is successfully transmitted, whether the MM is rejected by a user of the receiving terminal, whether the user of the receiving terminal can receive a notification of the arrival of the MM within a mail box and then download the MM, whether the user of the receiving terminal can recognize the MM, etc.

Referring to FIG. 1, an exemplary block diagram for explaining a multimedia service concept according to a related art is illustrated. For example, in order for a user of a transmitting terminal I to transmit a multimedia message to a receiving terminal 3, additional information (phone number of the transmitting terminal, phone number of the receiving terminal, etc.) is included in the multimedia message. The multimedia message including the additional information is then transmitted to a MMS 2.

The MMS 2, having received the multimedia message and additional information, stores the corresponding information and then transmits a short message to the receiving terminal 3 to inform of the arrival of the multimedia message. The receiving terminal 3 may then inform a user of the short message. The informed user of the receiving terminal 3 then accesses the MMS 2 to check out the multimedia message. If the multimedia check is executed by the receiving terminal 3, the MMS 2 provides notice of this fact to the transmitting terminal 1 using a short message.

FIG. 2 illustrates an exemplary diagram of a multimedia message transmission confirmation screen of a mobile communication terminal according to the prior art. For example, in the case of transmitting a multimedia message, a mobile communication terminal according to a related art requests from an MMS server a transmission state message relating to the transmitted message and then outputs the transmission state message received from the MMS server on a display panel.

Similarly, in the case that the related art mobile communication terminal transmits the multimedia message, a simple transmission notification message and a phone number of a receiving terminal, as shown in FIG. 2, are displayed. Thus, in the case of transmitting a plurality of multimedia messages to a specific terminal in order, the terminal is unable to know which transmission confirmation message displayed on the display panel corresponds to which one of a plurality of the previously transmitted messages.

Accordingly, when attempting to retransmit a message that failed in transmission from among the plurality of the previously transmitted messages, it may be impossible to identify the message to be retransmitted due to the fact that the terminal is unable to know which transmission confirmation message displayed on the display panel corresponds to which one of a plurality of the previously transmitted messages.

SUMMARY OF THE INVENTION

Accordingly, the present invention is directed to a mobile communication terminal and a multimedia message processing method that substantially obviate one or more problems due to the limitations and disadvantages of the related art.

One embodiment herein described discloses a mobile communication terminal. The mobile communication terminal includes a memory for storing a plurality of multimedia message transmission information, each corresponding to a different one of a plurality of multimedia messages intended to be delivered to a recipient. The mobile communication terminal further includes a control unit configured to receive multimedia message transmission result information provided from a multimedia message service server regarding the delivery of a specified message among the plurality of multimedia messages and to compare the received multimedia message transmission result information to the multimedia message transmission information stored in the memory. The mobile communication terminal also includes an output unit that, in response to the comparison performed by the control unit, is configured to output a transmission confirmation message to a user of the mobile communication terminal that indicates whether the specified message among the plurality of multimedia messages has been successfully delivered or not to the recipient.

A further embodiment herein described relates to a multimedia message service network that includes one or more mobile communication terminals transmitting and/or receiving a multimedia message via a mobile communication network. The mobile communication terminal stores a plurality of multimedia message transmission information. A wireless application protocol gateway for enabling the multimedia messages transmitted from each of the communication terminals to be efficiently forwarded and a multimedia message service center for processing the multimedia message to be transmitted/received between the mobile communication terminals are also included in the network. The mobile communication terminal compares a message ID of a transmitted multimedia message included in a transmission confirmation message received from the multimedia message service center with transmission information stored in the terminal. This comparison is then used to indicate to a user whether a specified multimedia message corresponding to the transmission confirmation message has been successfully delivered or not to a recipient.

Embodiments of the invention further extend to the related methods of comparing multimedia message transmission result information to multimedia message transmission information stored in the memory. These methods can be used to transmission confirmation messages that indicate to a user of a mobile communication terminal whether specified message among a plurality of multimedia messages have been successfully delivered or not to a recipient.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. Note that the embodiments disclosed herein are for illustration only and are not intended to limit the scope of the invention in any way. In addition, the various modules, functional blocks and/or components as disclosed in relation to FIGS. 3-7 are for illustrative purposes only. As will be appreciated, there are any numbers of additional modules, functional blocks and/or components that may be used to practice the embodiments disclosed herein. Accordingly, any use of a specific module, functional block and/or component for performing a particular function, act, and/or step should not be used to limit any of the embodiments disclosed herein unless explicitly stated in this description.

Figure 1:
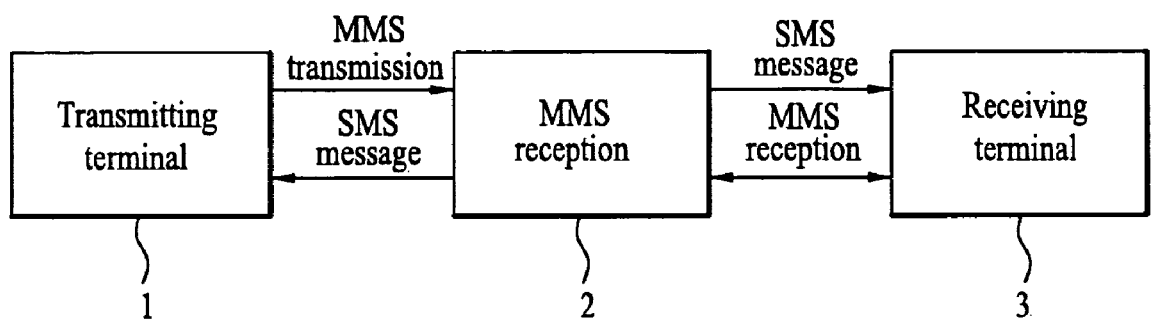
FIG. 1 is an exemplary block diagram for explaining a multimedia service concept according to a related art.
Figure 2:
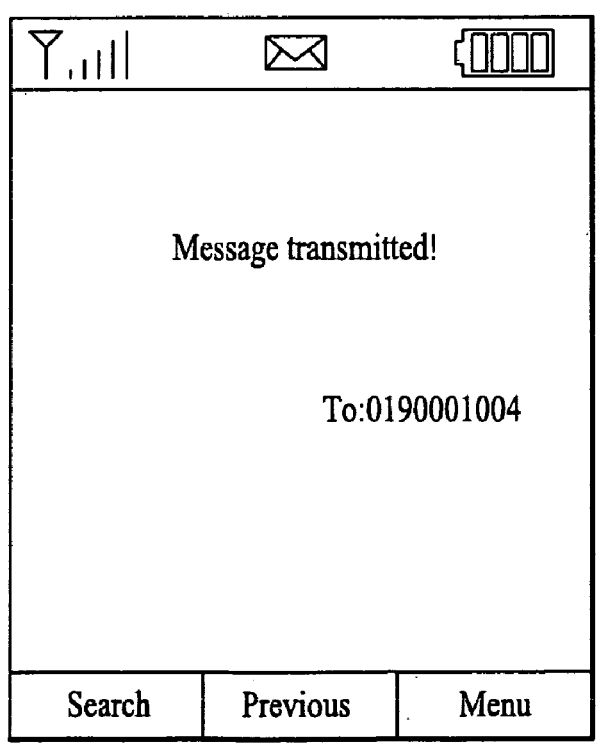
FIG. 2 is an exemplary diagram of a multimedia message transmission confirmation screen of a mobile communication terminal according to a related art.
Figure 3:
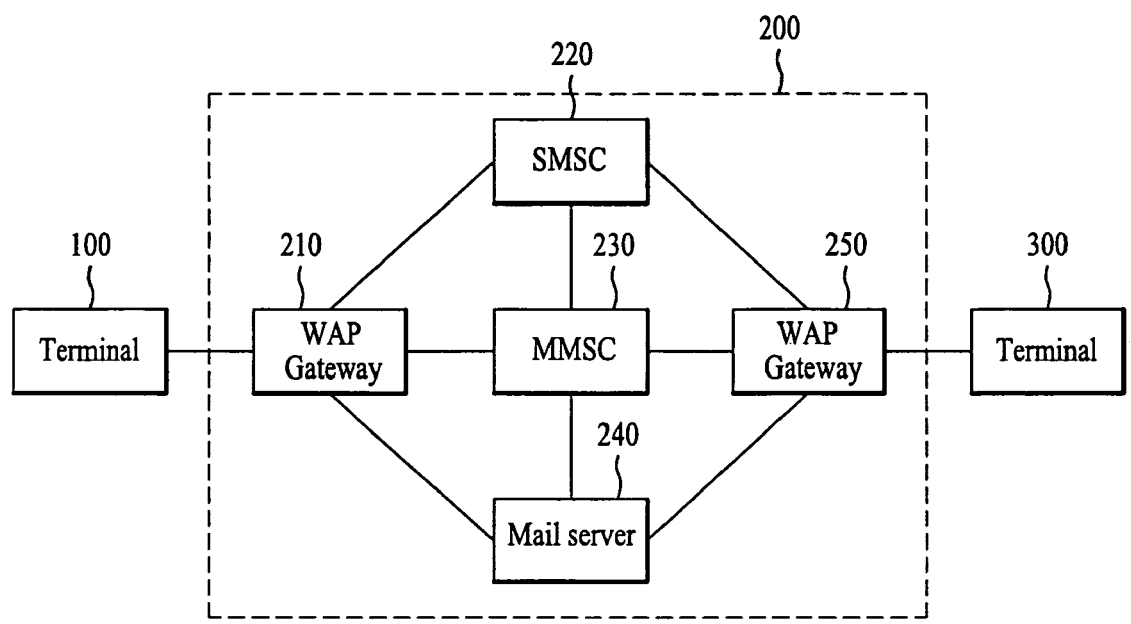
FIG. 3 is a schematic block diagram of a multimedia message service network according to the present invention.

Referring to FIG. 3, a schematic block diagram of a multimedia message service network according to a specific embodiment of the present invention is depicted. FIG. 3 includes mobile communication terminals 100 and 300 transmitting/receiving multimedia messages (MM) via a mobile communication network 200, a WAP (wireless application protocol) gateway 210 (and WAP gateway 250) for enabling the MM transmitted from each of the mobile communication terminals 100 and 300 to be efficiently forwarded, and an MMSC (multimedia message service center) 230 processing the MM to be transmitted/received between the mobile communication terminals 100 and 300.

Note that the mobile communication network 200 may have at least one wireless communication network within each zone. Further, the network and/or mobile communication terminals can be implemented by being defined by one of the mobile communication standards including, but not limited to, GSM standard, GPRS standard, EDGE standard, UMTS standard and various CDMS standards.

Additionally, each of the mobile communication terminals 100 and 300 may be a remote communication device having a mobile communication module. For instance, each of the mobile communication terminals 100 and 300 may correspond to, but are not limited to, a mobile phone, a personal computer, a laptop computer, a palm-top computer, a PDA and the like. Further, the remote communication devices may include a wireless remote communication module connected to a mobile phone via a wire network connection or a wireless local network such as IR, Bluetooth and the like.

The WAP gateway 210 (and WAP gateway 250) is a system that plays a buffering role between a wireless network and a wire based network implementing the WAP (wireless application protocol) as a wireless Internet protocol. Additionally, the WAP gateway 210 (and WAP gateway 250) encodes/decodes the forwarded multimedia messages to make the messages suitable for each wire/wireless environment so that the MM can be efficiently forwarded between the mobile communication terminals 100 and 300.

The MMSC (multimedia message service center) 230 processes the MM including, but not limited to, characters, audio, image, video and the like between the mobile communication terminals 100 and 300. Additionally, the MMSC 230 is capable of message forwarding, media conversion in wire/wireless environment, message notification via a Short Message Service (SMS), MM management and the like between mobile communication systems supporting a MMS. In particular, the MMSC 230 provides a message state check for the MM processed by the MMSC 230.

Specific functions of MMSC 230 will now be explained. For example, the MMSC 230 forwards the MM between the mobile communication terminals 100 and 300 via a plurality of protocols such as, but not limited to, SMTP (Simple Mail Transfer Protocol), MIUA (Multipurpose Internet Mail Extensions), IMAP (Internet Mail Access Protocol), SMPP (Short Message Peer to Peer), WAP (Wireless Application Protocol), HTTP (HyperText Transfer Protocol), etc.

While forwarding the MM, the MMSC 230 supports a non-real-time multimedia message service in which MM received from a prescribed terminal is temporarily stored to be forwarded to a corresponding terminal. The MMSC 230 notifies the respective mobile communication terminals of a message indicating that a new message has arrived, a message forwarding situation, a recipient message search, a message forwarding error or the like via SMS.

Moreover, the MMSC 230 converts image formats such as JPEG (Joint Photographic Expert Group), GIF (Graphics Interchange Format), PNG (Portable Network Graphics), BMP (Bit MaP), WBMP (Wireless BMP), etc., audio formats such as WAV, MP3 (MPEG layer 3), MIDI (Musical Instrument Digital Interface), etc., and video formats such as AVI (Audio Video Interleaving), MPEG (Moving Picture Experts Group), ASF (Advanced Stream Format), WMV (Windows Media Video), etc. to be optimized for each wireless environment when transmitting the converted format via the mobile communication network.

The MMSC 230 also sets a priority of the MM and a valid period of the MM and provides message forwarding methods such as reserved transmission or an attachment transmission for efficient message forwarding. Further, the MMSC 230 provides a management function such as a message filtering function to separate a processed message or to reject a specific message.

Referring again to FIG. 3, network 200 further includes an SMSC (short message service center) 220 and a mail server 240. The SMSC 220 is configured to interoperate with an SMS and an MMS via the SMPP (short message peer to peer) protocol and notifies of various kinds of information generated in the MMS process to the respective mobile communication terminals 100 and 300.

Mail server 240 provides the MM processed by the MMSC 230 in an e-mail format to the respective mobile communication terminals 100 and 300 in a way similar to that of the SMSC 220. Specifically, the mail server 240 provides the processing of the multimedia message between an MMS client in a wire environment and an MMS terminal in a wireless environment and notifies of the various kinds of information generated by the MMS process to the MMS client.

Figure 4:
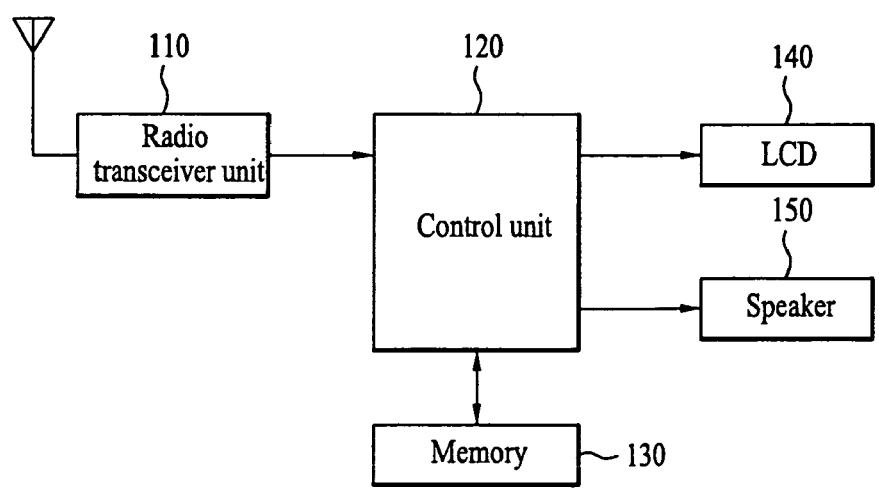
FIG. 4 is a block diagram of a mobile communication terminal according to the present invention.

Turning now to FIG. 4, a schematic block diagram of a mobile communication terminal according to an embodiment of the present invention is illustrated. The mobile communication terminal, which may correspond to terminals 100 and 300 of FIG. 3, although this is not required, includes a memory 130 for storing a plurality of multimedia message transmission information therein and a control unit 120 for receiving multimedia message transmission result information provided from a multimedia message service server via a radio transceiver unit 110. The control unit 120 is configured to compare the received multimedia message transmission result information with the multimedia message transmission information stored in the memory 130. The control unit 120 then outputs a control signal according to a corresponding comparison result. For example, a speaker 150 may audibly output the multimedia message transmission result information according to the control signal provided from the control unit 120 and a display unit (LCD) 140 may visually display the multimedia message transmission result information according to the control signal provided from the control unit 120.

Figure 5:
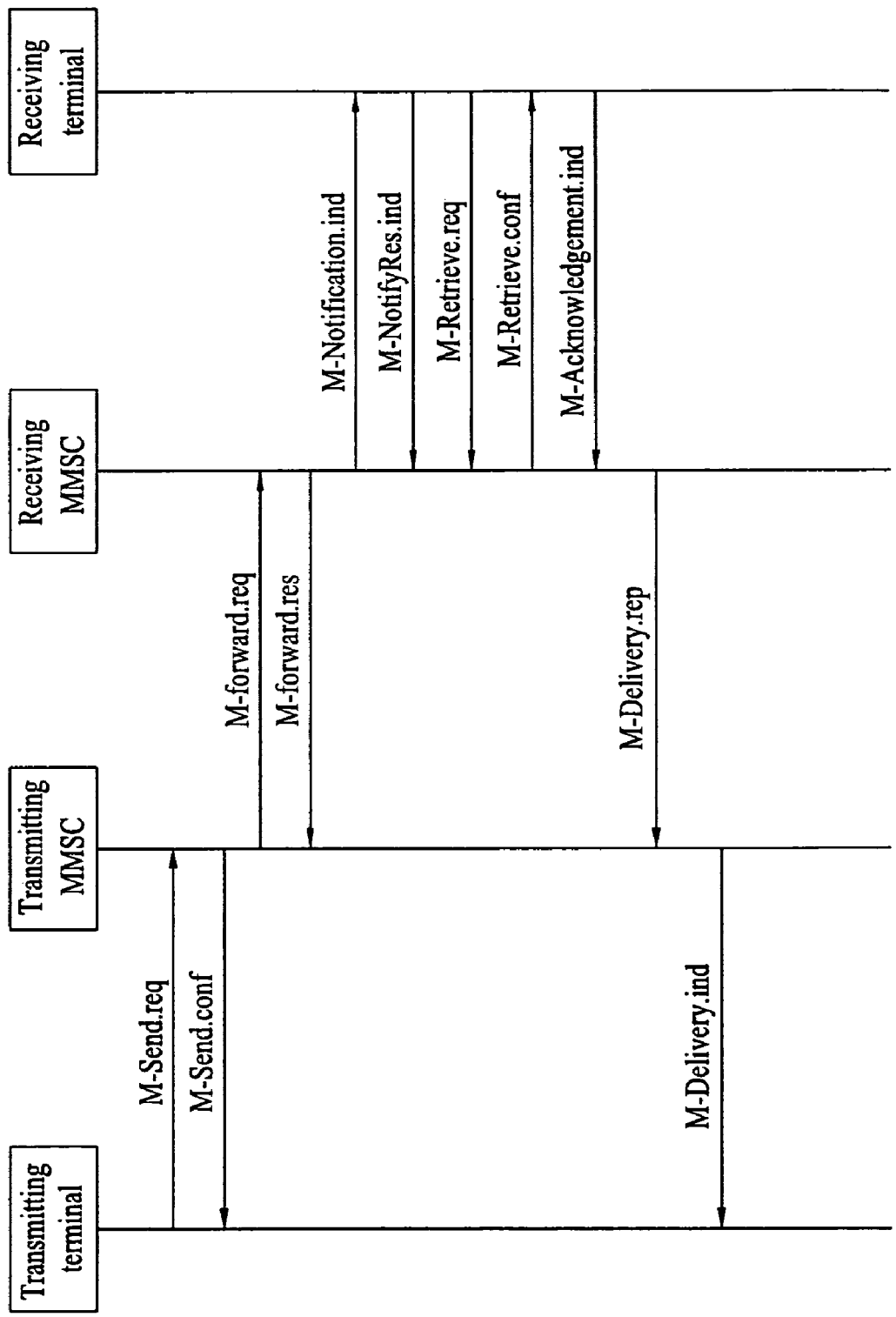
FIG. 5 is a signal processing flowchart of a multimedia message processing method according to the present invention.

Referring to FIG. 5, a signal processing flowchart of a multimedia message processing method in accordance with embodiments of the present invention is shown. For example, when transmitting a multimedia message of a MMS via a WAP, various messages relating to a transmission state of the multimedia message are transmitted and received on an MMS network. The multimedia messages typically include a header and a body selectively including multimedia objects.

According to the flowchart of FIG. 5, a transmitting terminal (user agent: mobile communication terminal) includes a multimedia message (MM) as part of a message transmission request message "M-Send.req" and then transmits the message to a transmission multimedia message server (depicted in FIG. 5 as transmitting MMSC). The "M-Send.req" message and the other messages illustrated in FIG. 5 are Protocol Data Units (PDUs) of a Multimedia Message System. The "M-Send.req" message includes a time stamp, subject of the multimedia message, priority, delivery report request, and recipient address.

In response, the transmission multimedia message server includes a message ID as part of a transmission request message reception confirmation message "M-Send.conf" and then transmits the confirmation message to the transmitting terminal. Upon receipt, a control unit within the transmitting terminal stores the message ID included in the confirmation message "M-Send.conf" in a memory.

The transmitting multimedia message server then transmits a message "M-forward.req" to a receiving multimedia message server (depicted as receiving MMSC in FIG. 5) that manages a receiving terminal. The receiving multimedia message server, in response to the received message "M-forward.req", then transmits a message "M-forward.res" to the transmitting multimedia message server.

Subsequently, the receiving multimedia message server transmits a reception notification message "M-Notification.ind" to the corresponding receiving terminal. Accordingly, the receiving terminal recognizes that it is ready to download the multimedia message to be transmitted from the receiving multimedia message server.

The receiving terminal transmits a message "M-NotifyRes.ind" to the receiving multimedia message server in response to the received message "M-Notification.ind". In the case that the receiving terminal has a request message "WSPGET.req", the receiving terminal transmits the message "M-Retrieve.req" to the receiving multimedia message server.

The receiving multimedia message server forwards the multimedia message to be transmitted to the receiving terminal together with a message "M-Retrieve.conf" corresponding to the message "M-Retrieve.req". The receiving terminal then transmits a response message "M-Acknowledgement.ind" to the receiving multimedia message server.

According to a request from the transmitting terminal, the receiving multimedia message server transmits a message "M-Delivery.rep" representing a delivery report of the multimedia message to the transmitting multimedia message server.

The transmitting multimedia message server then transmits the message "M-Delivery.ind" in response to receiving the message "M-Delivery.rep" to the transmitting terminal. In the "M-Delivery.ind" packet message, a message ID for an original transmission multimedia message is included.

Accordingly, the transmitting terminal enables the delivery report of the transmitted multimedia message to be confirmed by comparing the message ID included in the transmission report message "M-Delivery.ind" to the message ID previously stored in the memory.

Figure 6:
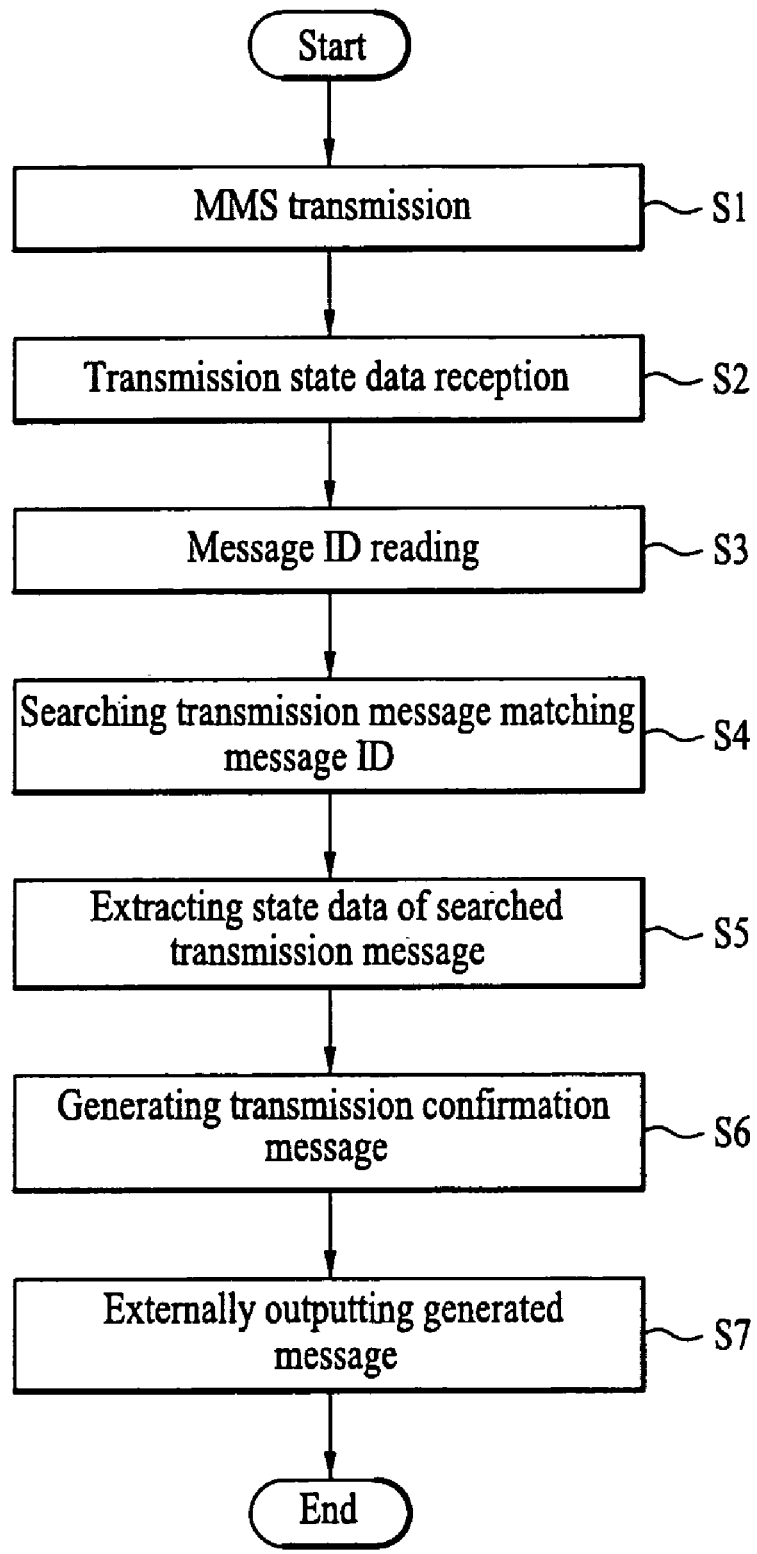
FIG. 6 is a flowchart of a multimedia message processing method according to the present invention.
Figure 7:
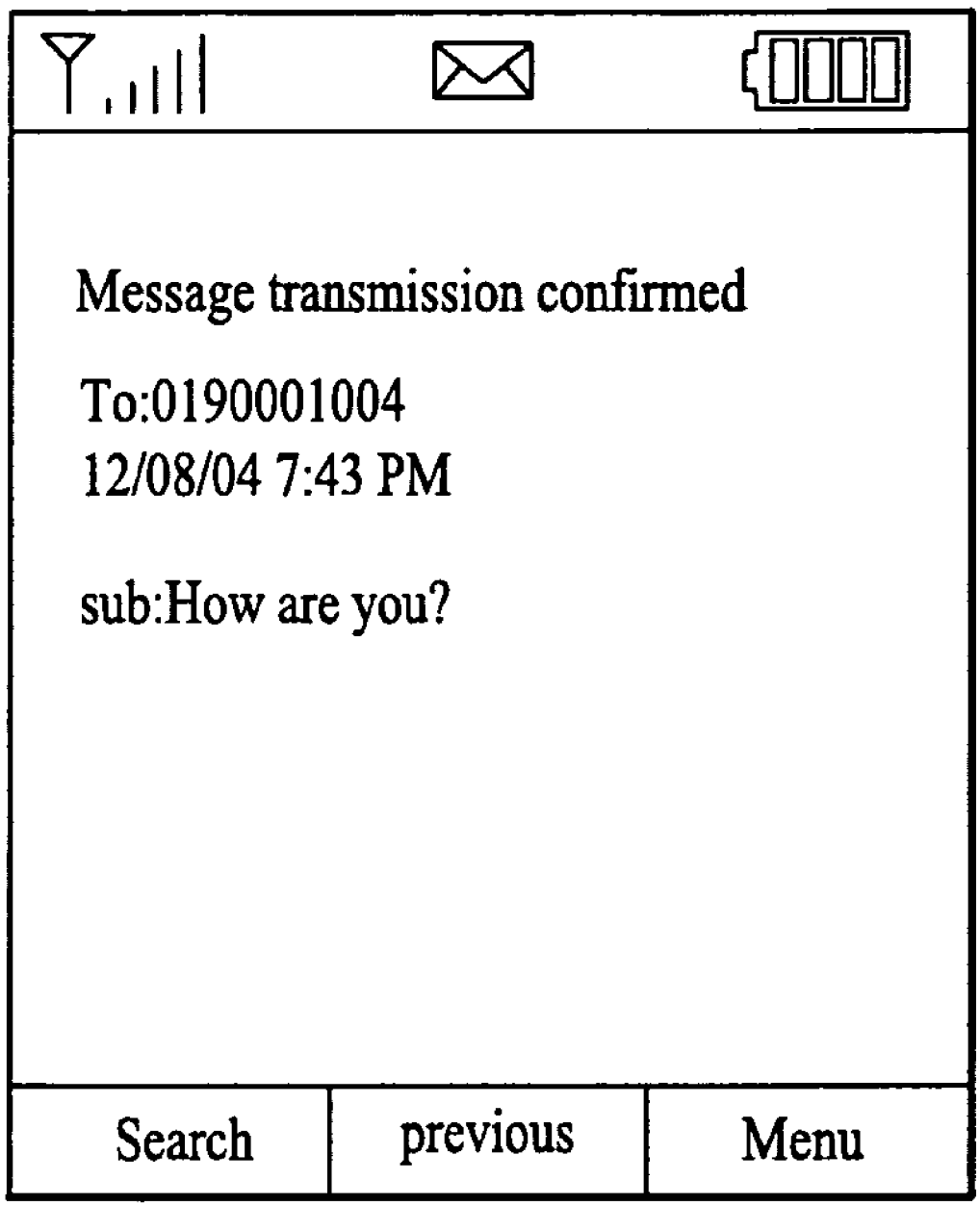
FIG. 7 is an exemplary diagram of a multimedia message transmission confirmation screen of a mobile communication terminal according to the present invention.
Figure 8:
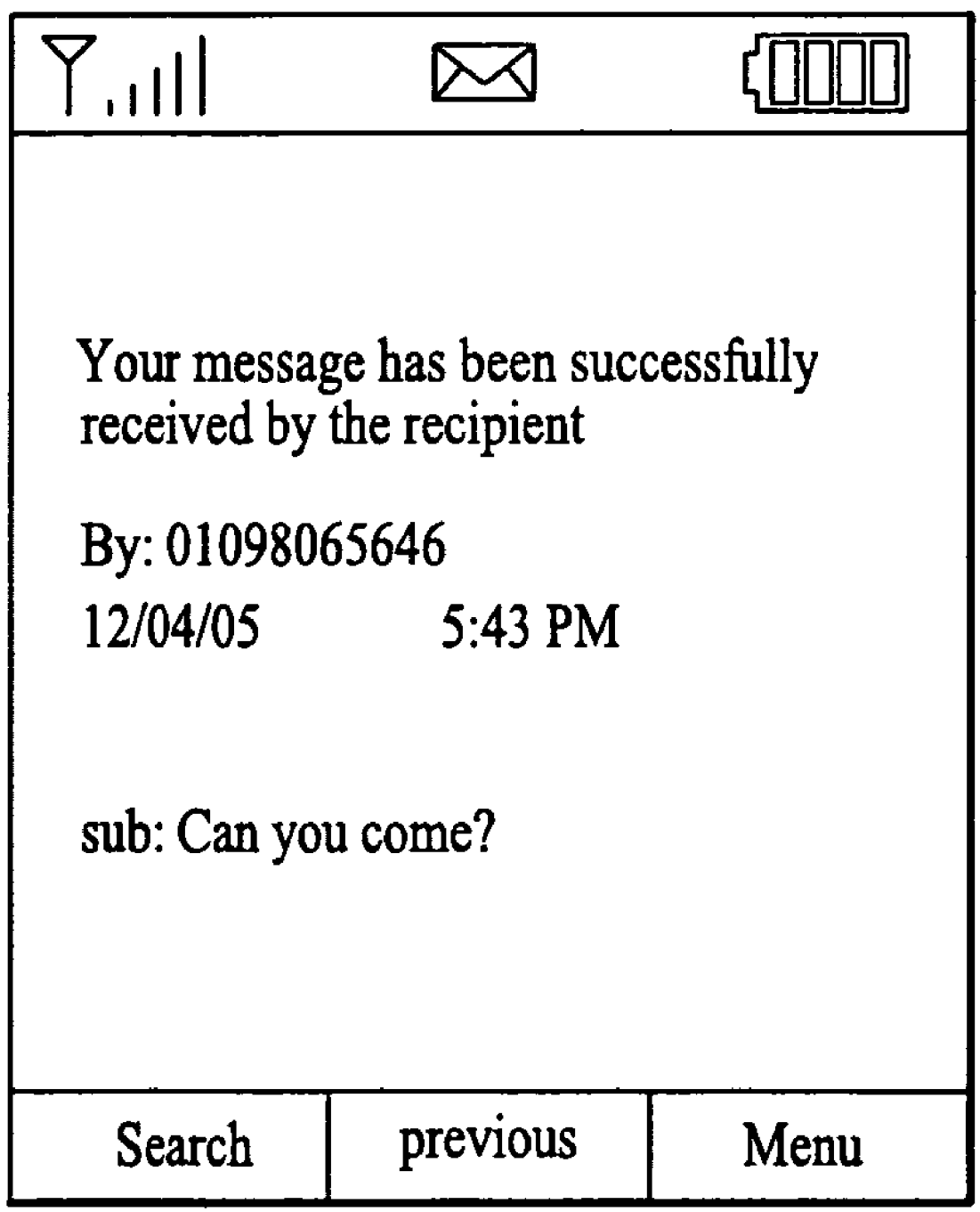
FIG. 8 is an exemplary diagram of a multimedia message transmission confirmation screen of a mobile communication terminal acknowledging that the message has been delivered and that the message has been received by the recipient according to the present invention.

FIG. 6 is a flowchart of a multimedia message processing method according to embodiments of the present invention. FIG. 7 is an exemplary diagram of a multimedia message transmission confirmation screen of a mobile communication terminal according to embodiments of the present invention. FIG. 8 illustrates another example of a multimedia message transmission confirmation screen of a mobile communication terminal according to embodiments of the present invention. FIG. 6 will be described with frequent reference to the messages of FIG. 5.

Referring first to FIG. 6, a plurality of multimedia messages to be transmitted to a specific terminal are composed and are then sequentially transmitted via a mobile communication network. In the process of transmitting, the composed messages are stored in the terminal in a data format according to a predetermined time and/or selection (S1).

Once the transmitted message is received by a transmitting MMS server, the aforesaid transmission confirmation message "M-Send.conf" is received by a transmitting terminal. After completion of the transmission of the plurality of the multimedia messages, a transmission confirmation message "M-Delivery.ind" corresponding to each of the transmitted messages is finally received according to transmission/reception of each of a plurality of the aforesaid state messages (S2).

In this case, a delivery state notification or transmission state data of the multimedia message is stored in the "M-delivery.ind" message. The message includes a header and a plurality of data fields. The header indicates that the multimedia message was transmitted to the transmitting terminal from the transmitting MMS server. Detailed data of the transmitted message format, a transmitting terminal indication, a WAP-using version and the like are stored in the data fields, respectively.

In particular, the "M-Delivery.ind" message includes a data field designated as "X-Mms-Message-ID" that stores an internal number (message ID) of the transmitted multimedia message referred to by the message. Further, the data fields designated as "TO" and "Date" include data for processing the multimedia message, e.g., a transmission date to the receiving terminal, a rejected date, an expiry date data of a valid transmission period and the like.

Accordingly, once the "M-Delivery.ind" message is received, the transmitting terminal extracts the message ID data of the transmitted multimedia message by reading the data and searches the plurality of the multimedia messages stored in the terminal for the multimedia message matching the message ID (S3, S4).

As a result of the searching, if the multimedia message matching the message ID is found, subject data of the message is extracted. Further, the extracted subject data, the transmitted time of the transmitted message stored in the "M-Delivery.ind" message and/or the rejection date or valid transmission period data of the receiving terminal are read (S5).

Subsequently, a transmission confirmation message is generated (S6) and is externally outputted to the user of the mobile communication terminal (S7) to indicate whether the specified messages among the plurality of multimedia messages has been successfully delivered or not to the recipient.

FIG. 7 illustrates a transmission confirmation message indicating that the transmitted message has been successfully transmitted to the receiving terminal, and includes the extracted subject data and read-time data. FIG. 8 is another example of a transmission confirmation message, and acknowledges that the multimedia message has been successfully delivered and received by the recipient. In general, the transmission confirmation message can be recognized by a user via a prescribed alarm sound or vibration, can be externally outputted via a display panel provided to the terminal, or can be outputted as a voice signal corresponding to each data.

Note that although the MMS operating method in a mobile communication terminal according to embodiments of the present invention is explained with reference to the attached drawings, the present invention is not limited to the embodiments and drawings disclosed in the present specification.

Accordingly, in the above-configured MMS operating method in a mobile communication terminal of the present invention, by reading the delivery confirmation data received in transmitting the multimedia message and by outputting the subject and transmitted time of the transmitted message corresponding to the read delivery confirmation data, a user is able to individually confirm the transmission states of the respective transmitted messages.

Accordingly, the present invention can considerably enhance user's convenience. In particular, in the case that the transmitted messages are not confirmed in part, a user is able to sort the non-confirmed messages for retransmission. Hence, the present invention can enhance user's reliance on a product.

It will be apparent to those skilled in the art that various modifications and variations can be made in the present invention without departing from the spirit or scope of the inventions which can provide the precise transmission state data for each of the transmitted messages to the user in a manner of outputting the subject and sent time of the transmitted message by reading the delivery confirmation data received in transmitting the multimedia message. Thus, it is intended that the present invention covers the modifications and variations of this invention provided they come within the scope of the appended claims and their equivalents.

What is claimed is:

1. A mobile communication terminal comprising:
a display;
an audio output unit;
a memory to store a plurality of multimedia message transmission information, each corresponding to a different one of a plurality of multimedia messages to be transmitted to a same recipient terminal, wherein the plurality of multimedia messages are transmitted to the same recipient terminal through at least one multimedia message service center; and
a controller configured to:
receive a first multimedia message transmission result information from a multimedia message service server and a second multimedia message transmission result information from the same recipient terminal regarding transmission of each of the transmitted multimedia messages,
store a message identification (ID) included in the first multimedia message transmission result information in the memory,
compare the stored message ID to a message ID included in the second multimedia message transmission result information,
search the transmitted multimedia messages for at least one multimedia message matching the message ID included in the second multimedia message transmission result information,
extract a plurality of transmission state information from the multimedia message transmission information corresponding to the searched multimedia messages, wherein the plurality of transmission state information includes a message subject, a transmitted time, a rejected time, and a expiry time of the searched multimedia message,
generate at least one multimedia message confirmation information using the extracted transmission state information,
search the transmitted multimedia messages for at least one multimedia message successfully transmitted to the same recipient terminal based on the at least one multimedia message confirmation information, search for at least one message confirmed by the same recipient terminal based on the at least one multimedia message confirmation information corresponding to the at least one successfully transmitted multimedia message, control the display to display information for indicating whether the at least one searched message is confirmed by the same recipient terminal, wherein the information includes at least one of a confirmed time or a subject title of the at least one searched message, control the audio output unit to output an audio signal for indicating whether the at least one searched message is confirmed by the same recipient terminal, wherein the audio signal includes at least one of a confirmed time or a subject title of the at least one searched message, search for at least one message unconfirmed by the same recipient terminal based on the at least one multimedia message confirmation information corresponding to the at least one successfully transmitted multimedia message, control the audio output unit to output an audio signal for indicating whether the at least one searched message is unconfirmed by the same recipient terminal, control the display to display the unconfirmed multimedia message, and retransmit a selected multimedia message if the unconfirmed multimedia message is selected.

2. The mobile communication terminal of claim 1, wherein the mobile communication terminal is one of a mobile phone, a personal computer, a laptop computer, a palm-top computer, or a PDA.

3. The mobile communication terminal of claim 1, wherein the first and second multimedia message transmission result information includes a header and a body selectively including multimedia objects.

4. A multimedia message service network comprising:
   at least one mobile communication terminal to transmit a plurality of multimedia messages to a same recipient terminal via a mobile communication network and to store a plurality of corresponding multimedia message transmission information;
   a wireless application protocol gateway enabling the multimedia messages transmitted from the communication terminal to be forwarded; and
   a multimedia message service center processing the multimedia messages,
   wherein the mobile communication terminal receives a first multimedia message transmission result information from a multimedia message service center and a second multimedia message transmission result information from the same recipient terminal,
   compares a message identification (ID) included in the first multimedia message transmission result information to a message ID included in the second multimedia message transmission result information,
   searches the transmitted multimedia messages for at least one multimedia message matching the message ID included in the second multimedia message transmission result information,
   extracts a plurality of transmission state information from the multimedia message transmission information corresponding to the searched multimedia messages, wherein the plurality of transmission state information includes a message subject, a transmitted time, a rejected time, and a expiry time of the searched multimedia message, and
   generates at least one multimedia message confirmation information using the extracted transmission state information,
   wherein the mobile communication terminal searches the transmitted multimedia messages for at least one multimedia message is successfully transmitted to the same recipient terminal based on the at least one multimedia message confirmation information, searches for at least one message confirmed by the same recipient terminal based on the at least one multimedia message confirmation information corresponding to the at least one successfully transmitted multimedia message, displays information for indicating whether the at least one searched message is confirmed by the same recipient terminal, wherein the information includes at least one of a confirmed time or a subject title of the at least one searched message, outputs an audio signal for indicating whether the at least one searched message is confirmed by the same recipient terminal, wherein the audio signal includes at least one of a confirmed time or a subject title of the at least one searched message, searches for at least one message unconfirmed by the same recipient terminal based on the at least one multimedia message conformation information corresponding to the at least one successfully transmitted multimedia message, outputs an audio signal for indicating whether the at least one searched message is unconfirmed by the same recipient terminal, displays the unconfirmed multimedia message, and retransmits a selected multimedia message if the unconfirmed multimedia message is selected.

5. The multimedia message service network of claim 4, further comprising:
   a short message service center to compatibly interoperate with a short message service and a multimedia message service via a short message peer to peer protocol, the short message service center forwarding information generated in a multimedia message service process to the mobile communication terminal; and
   a mail server to provide the multimedia message processed by the multimedia message service center in an e-mail format to the mobile communication terminal.

6. The multimedia message service network of claim 4, wherein the at least one mobile communication terminal is one of a mobile phone, a personal computer, a laptop computer, a palm-top computer, or a PDA.

7. The multimedia message service network of claim 4, wherein each multimedia message includes a header and a body selectively including multimedia objects.

8. A method of processing messages in a mobile communication terminal, comprising:
   transmitting a plurality of multimedia messages to a same recipient terminal via a mobile communication network;
   storing transmission information for each of the transmitted plurality of multimedia messages in a memory provided within the mobile communication terminal;
   receiving a first multimedia message transmission result information from a multimedia message service server and a second multimedia message transmission result information from the same recipient terminal regarding the transmission of each of the transmitted multimedia messages;
   storing a message ID included in the first multimedia message transmission result information in the memory;

comparing the stored message ID to a message ID included in the second multimedia message transmission result information;

searching the transmitted multimedia messages for at least one multimedia message matching the message ID included in the second multimedia message transmission result information;

extracting a plurality of transmission state information from the multimedia message transmission information corresponding to the searched multimedia messages, wherein the plurality of transmission state information includes a message subject, a transmitted time, a rejected time, and a expiry time of the searched multimedia message;

generating at least one multimedia message confirmation information using the extracted transmission state information, searching the transmitted multimedia messages for at least one multimedia message successfully transmitted to the same recipient terminal based on the at least one multimedia message confirmation information, search for at least one message confirmed by the same recipient terminal based on the at least one multimedia message confirmation information corresponding to the at least one successfully transmitted multimedia message, displaying information for indicating whether the at least one searched message is confirmed by the same recipient terminal, wherein the information includes at least one of a confirmed time or a subject title of the at least one searched message, outputting an audio signal for indicating whether the at least one searched message is confirmed by the same recipient terminal, wherein the audio signal includes at least one of a confirmed time or a subject title of the at least one searched message, search for at least one message unconfirmed by the same recipient terminal based on the at least one multimedia message confirmation information corresponding to the at least one successfully transmitted multimedia message, outputting an audio signal for indicating whether the at least one searched message is unconfirmed by the same recipient terminal, displaying the unconfirmed multimedia message; and retransmitting a selected multimedia message if the unconfirmed multimedia message is selected.

9. The method of claim 8, wherein the mobile communication terminal is one of a mobile phone, a personal computer, a laptop computer, a palm-top computer, or a PDA.

* * * * *